(12) United States Patent
     Riffe

(10) Patent No.: US 12,162,689 B2
(45) Date of Patent: Dec. 10, 2024

(54) APPARATUS TO EXTEND LIFT CAPACITY OF SIDEWALL BELT CONVEYOR

(71) Applicant: ROBBINS MINING, INC., Solon, OH (US)

(72) Inventor: Shirley Donnelly Riffe, Crab Orchard, WV (US)

(73) Assignee: Robbins Mining, Inc., Solon, OH (US)

( * ) Notice: Subject to any disclaimer, the term of this patent is extended or adjusted under 35 U.S.C. 154(b) by 117 days.

(21) Appl. No.: 18/171,240

(22) Filed: Feb. 17, 2023

(65) Prior Publication Data

US 2023/0257203 A1   Aug. 17, 2023

Related U.S. Application Data

(60) Provisional application No. 63/311,188, filed on Feb. 17, 2022.

(51) Int. Cl.
| | |
|---|---|
| *B65G 15/60* | (2006.01) |
| *B65G 17/12* | (2006.01) |
| *B65G 23/10* | (2006.01) |
| *B65G 23/44* | (2006.01) |

(52) U.S. Cl.
CPC ........... *B65G 15/60* (2013.01); *B65G 17/126* (2013.01); *B65G 23/10* (2013.01); *B65G 23/44* (2013.01); *B65G 2201/045* (2013.01)

(58) Field of Classification Search
CPC ...... B65G 15/60; B65G 17/126; B65G 23/10; B65G 23/44; B65G 2201/045; E21F 13/04
See application file for complete search history.

(56) References Cited

U.S. PATENT DOCUMENTS

| | | | | | |
|---|---|---|---|---|---|
| 3,881,590 | A | * | 5/1975 | Hartmann | B65G 15/14 198/716 |
| 4,195,724 | A | * | 4/1980 | Janitsch | B65G 15/14 198/626.2 |
| 4,585,118 | A | * | 4/1986 | Plaut | B65G 15/14 198/840 |
| 4,681,503 | A | * | 7/1987 | Nolte | B65G 67/606 414/142.5 |
| 5,320,471 | A | * | 6/1994 | Grathoff | B65G 67/606 414/140.7 |
| 6,457,576 | B1 | * | 10/2002 | Gunther | B65G 17/42 198/712 |
| 9,573,763 | B2 | * | 2/2017 | Lurie | B65G 23/32 |

* cited by examiner

*Primary Examiner* — Gene O Crawford
*Assistant Examiner* — Keith R Campbell
(74) *Attorney, Agent, or Firm* — Christensen O'Connor Johnson Kindness PLLC

(57) ABSTRACT

A belt tension-reducing device is provided, which includes a support member; a pliable central wheel assembly configured to engage a both downwardly and upwardly moving portions of the conveyor belt; first and second outboard roller assemblies positioned to engage the downwardly and upwardly moving portions, respectively. A second effective rolling radius of the pliable central wheel assembly at a contact point with the upwardly moving portion of the conveyor belt can be greater than a first effective rolling radius of the pliable central wheel assembly at a contact point with the downwardly moving portion of the conveyor belt to reduce stresses on the belt in a vertical shaft. The belt tension-reducing devices can be arranged in a stacked configuration within the vertical shaft.

20 Claims, 5 Drawing Sheets

APPARATUS TO EXTEND LIFT CAPACITY OF SIDEWALL BELT CONVEYOR

CROSS-REFERENCE TO RELATED APPLICATION

This application claims the benefit of Provisional Application No. 63/311,188, filed Feb. 17, 2022, the disclosure of which is hereby incorporated by reference herein in its entirety for all purposes.

BACKGROUND

Vertical or upright conveyor systems can be configured to remove excavated materials. In some applications, vertical conveyors can move excavated materials from a deep subterranean location to a surface elevation. These excavated materials, such as muck and the like, are typically generated by tunnel boring or material mining operations. Vertical conveyors, e.g., pocket conveyors, are a sidewall-type conveyor designed to transport materials along a steep incline or vertically.

U.S. Pat. No. 5,975,283, to Riffe (hereinafter "Riffe"), which is hereby incorporated by reference in its entirety, discloses a vertical belt conveyor system having a belt that includes a reinforced base belt portion and sidewalls connected to the base belt along opposite edge. Riffe notes that conveyor belts for this type of application may weigh as much as 75 pounds per foot, and the weight of the belt itself may produce very large belt tensions in a vertical orientation. The stresses in the conveyor belt will typically limit the practical depth that these systems can be deployed. Riffe discloses a vertical conveyor with a flexible side wall belt having a lower horizontal portion configured to receive excavated materials, and an upright portion (e.g., vertical or steeply angled) configured to carry the materials through a shaft from a lower location to a higher location, typically above ground level. An upper portion of the side wall belt is configured to deposit the muck onto a second conveyor at an upper elevation.

It will be appreciated that the upright portion of the belt may span a long distance. For example, a tunnel boring machine (TBM) boring a subterranean passageway (typically installing tunnel walls as the tunnel is being generated) can be working at a significant depth below the ground level. The excavated materials (muck) generated in the boring operations are transported via an extendable horizontal conveyor. The excavated materials are then transferred from the horizontal conveyor to a vertical conveyor configured to raise the muck to the surface for further processing and/or transport.

The lift distance of upright belt conveyors of this type may be limited by the strength of the conveyor belt, which experiences a maximum stress near the top of the conveyor where the weight of the belt and the transported materials imparts the greatest stress on the conveyor. It would therefore be beneficial to reduce the maximum tension experienced by the belt in an upright belt conveyor.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed.

As will be described in more detail below, the present disclosure provides examples of belt tension-reducing devices configured to extend lift capacity of an upright or vertical sidewall belt conveyor. Embodiments of the present disclosure are can be installed in several locations, for example to reduce the belt tension at a downturn deflection wheel (item 103, see FIG. 1), and to reduce the belt tension in the other load carrying portions along the belt, particularly near the top of the belt, thereby enabling an increase in the lift distance capacity of the conveyor system. The downturn deflection wheel 103 allows the belt to remain substantially vertical, but imparts significant stresses on the belt, limiting the maximum depth that the conveyor can be deployed before failure. The embodiments of the present disclosure are intended to extend the maximum depth that the conveyor can be deployed by reducing the stresses caused by the weight of the belt at the downturn deflection wheel 103.

Although embodiments of the present disclosure may be described with reference to a configuration of a belt tension-reducing device, including stacked and individual configurations shown in the FIGURES, one skilled in the relevant art will appreciate that the disclosed embodiments are illustrative in nature and therefore should not be construed as limited to such an application. It should therefore be apparent that the disclosed technologies and methodologies have wide application, and therefore may be suitable for use with many types of e. Accordingly, the following descriptions and illustrations herein should not limit the scope of the claimed subject matter.

Figure 1:
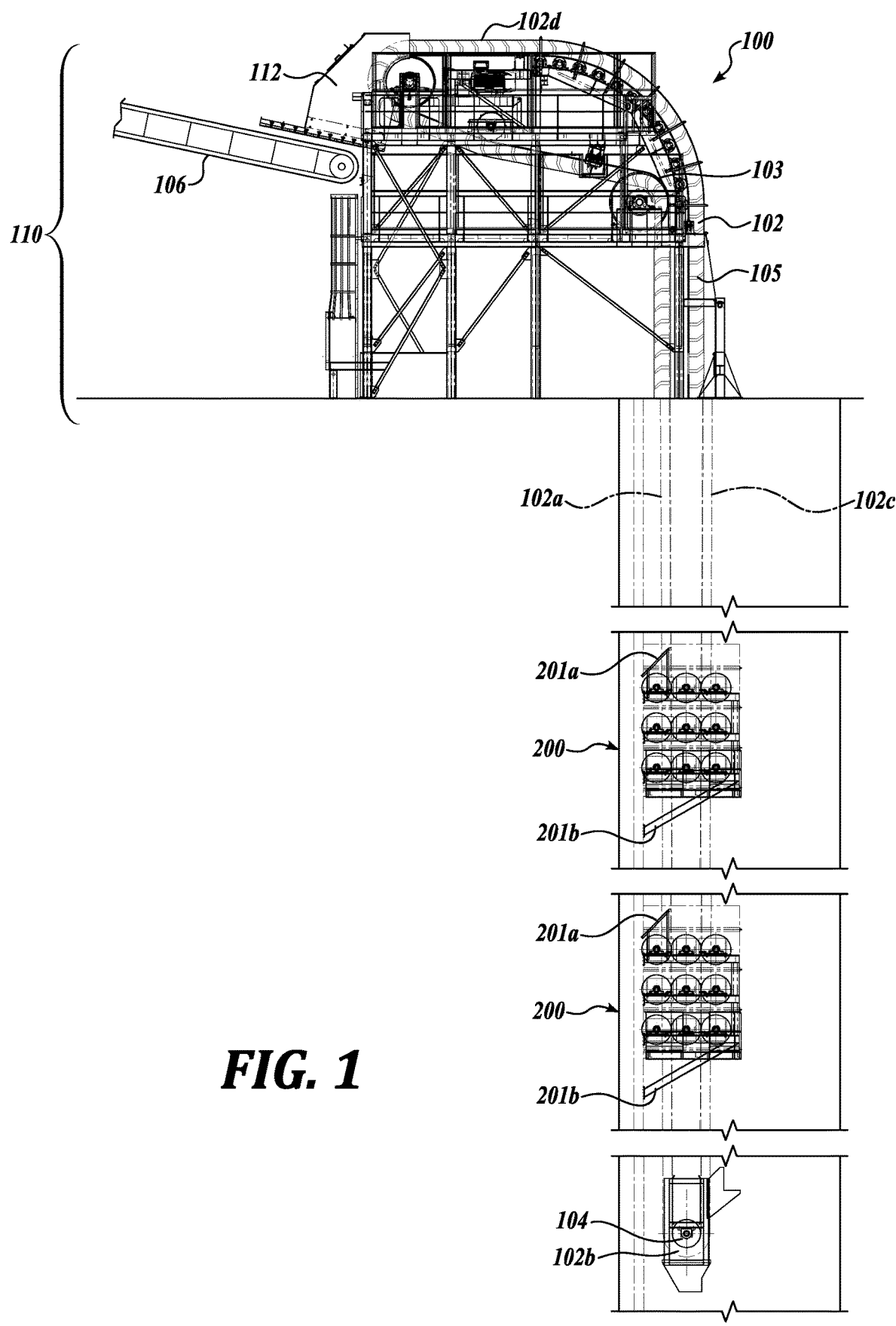
FIG. 1 is a vertical conveyor system in accordance with aspects of the present disclosure, wherein a plurality of belt tension-reducing device stacks are provided at spaced-apart locations along the vertical conveyor system.

FIG. 1 is a vertical conveyor system 100 ("system 100") in accordance with aspects of the present disclosure. The system 100 includes a plurality of belt tension-reducing device stacks 200 ("stacks 200") that are provided at spaced-apart locations along the vertical conveyor system 100. The system 100 includes a conveyor belt 102 for transporting muck from a mining operation up to the surface for further processing. Various segments of the conveyor belt 102 have been labeled herein for clarity in the below description, including: (1) the downwardly moving portion of the conveyor belt 102a traveling downward into a vertical mining shaft; (2) the portion of the conveyor belt 102b traveling around a take-up pulley 104; (3) the upwardly moving portion of the conveyor belt 102c traveling upward out of the vertical shaft parallel to the conveyor belt portion 102a; and (4) the transversely moving portion of the conveyor belt 102d traveling transversely to be unloaded.

The illustrated embodiment of FIG. 1 shows a conventional above-ground portion 110 of the system 100 in which the conveyor belt 102 curves and travels transversely at the conveyor belt portion 102d to a station 112 where the conveyor belt 102 curves again to release muck and the conveyor belt 102 continues along a return path back to the vertical shaft where the conveyor belt portion 102a travels downward into the vertical shaft. The station 112 may include one or more conveyors to transport the muck away from the conveyor belt 102. The above-ground portion 110 can include a supplemental conveyor 106 that is configured to transport material offloaded at the station 112 away from the conveyor belt 102 for transport, further processing, removal, etc. It will be appreciated that for substantially the entire length of the vertical shaft, the upwardly moving conveyor belt portion 102c and the downwardly moving conveyor belt portion 102a are closely spaced.

Figure 2A:
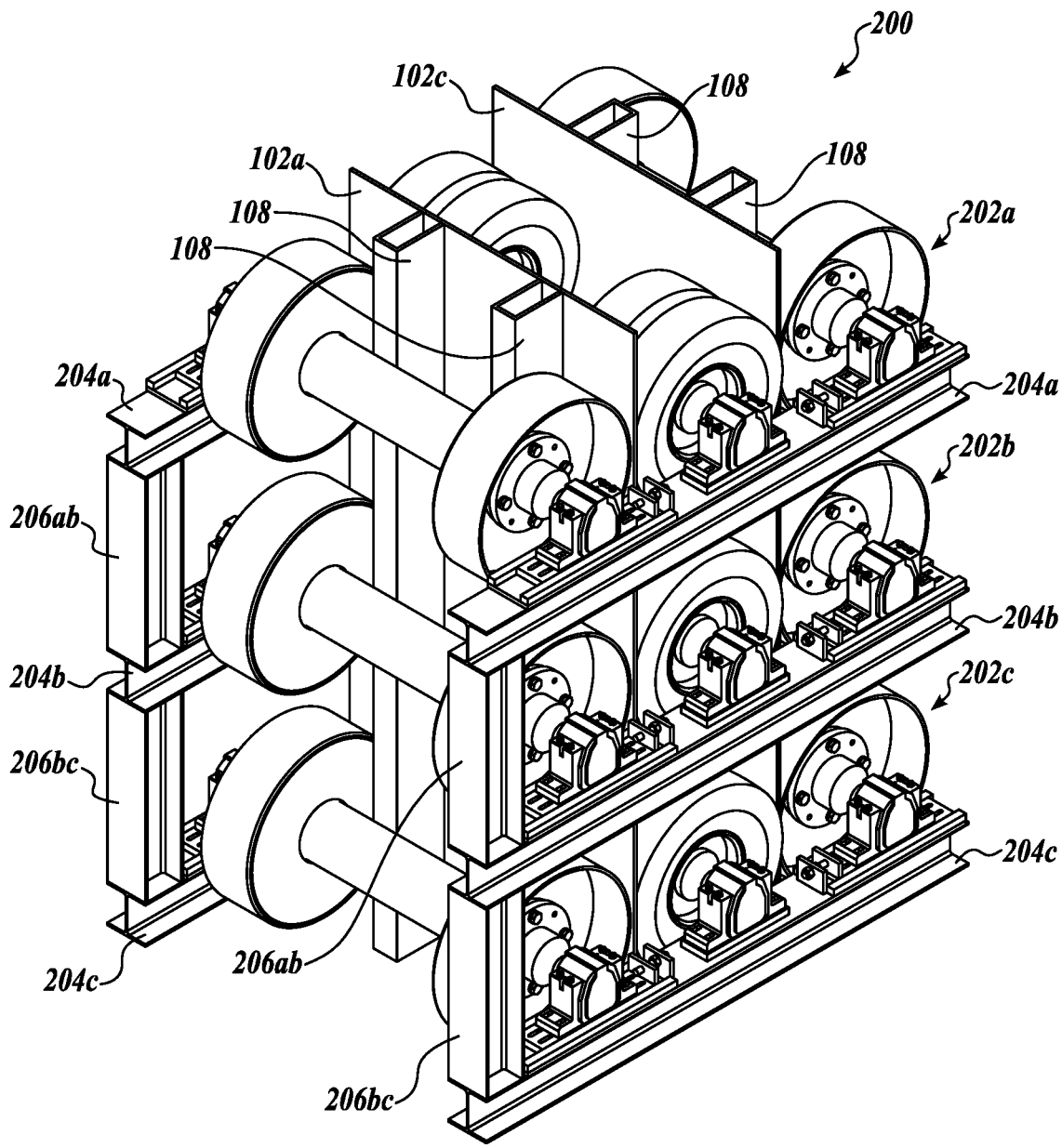
FIGS. 2A and 2B are perspective and side views, respectively, of one belt tension-reducing device stack shown in FIG. 1, having three belt tension-reducing devices in a stacked configuration.
Figure 2B:
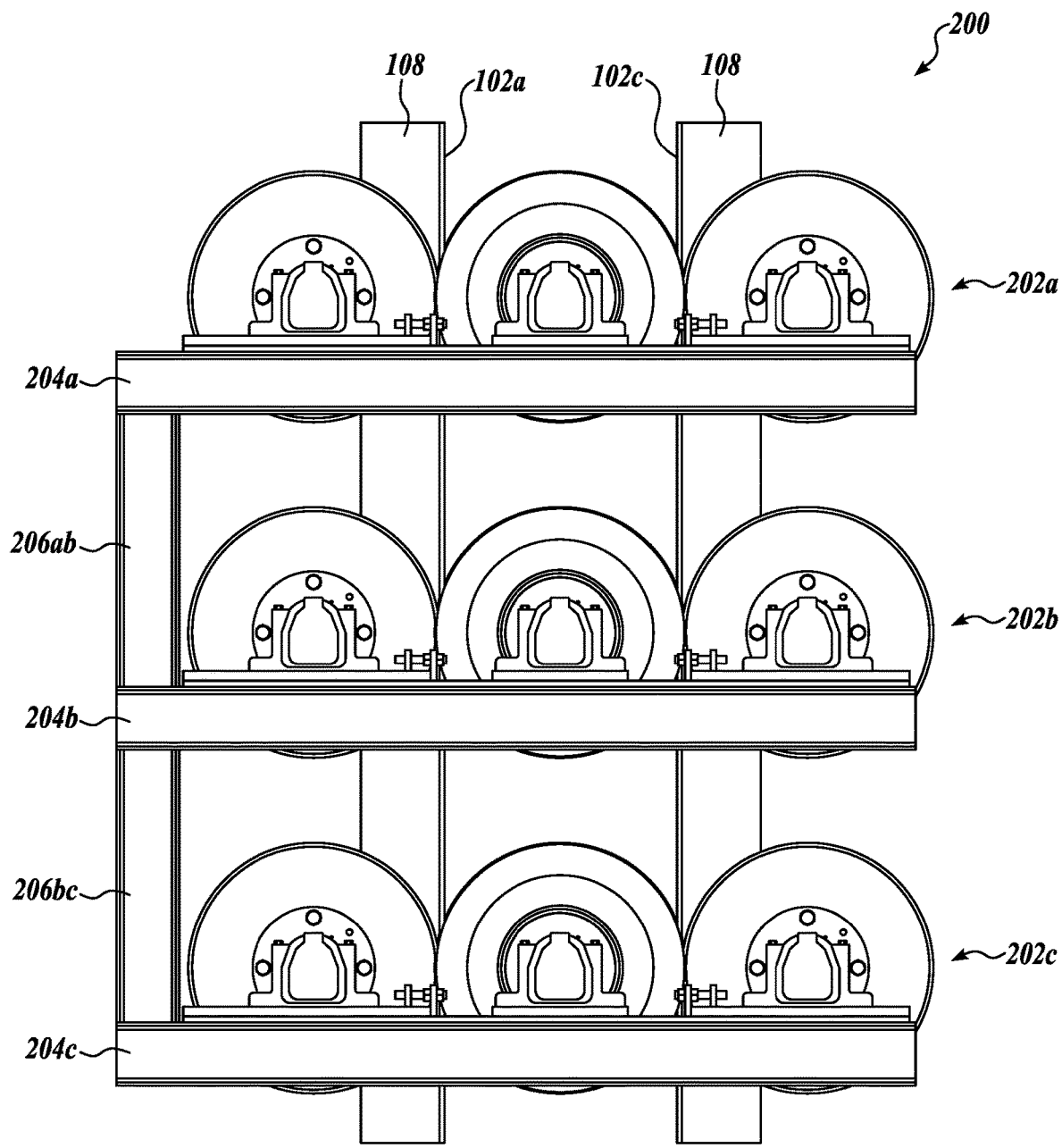
Figure 3A:
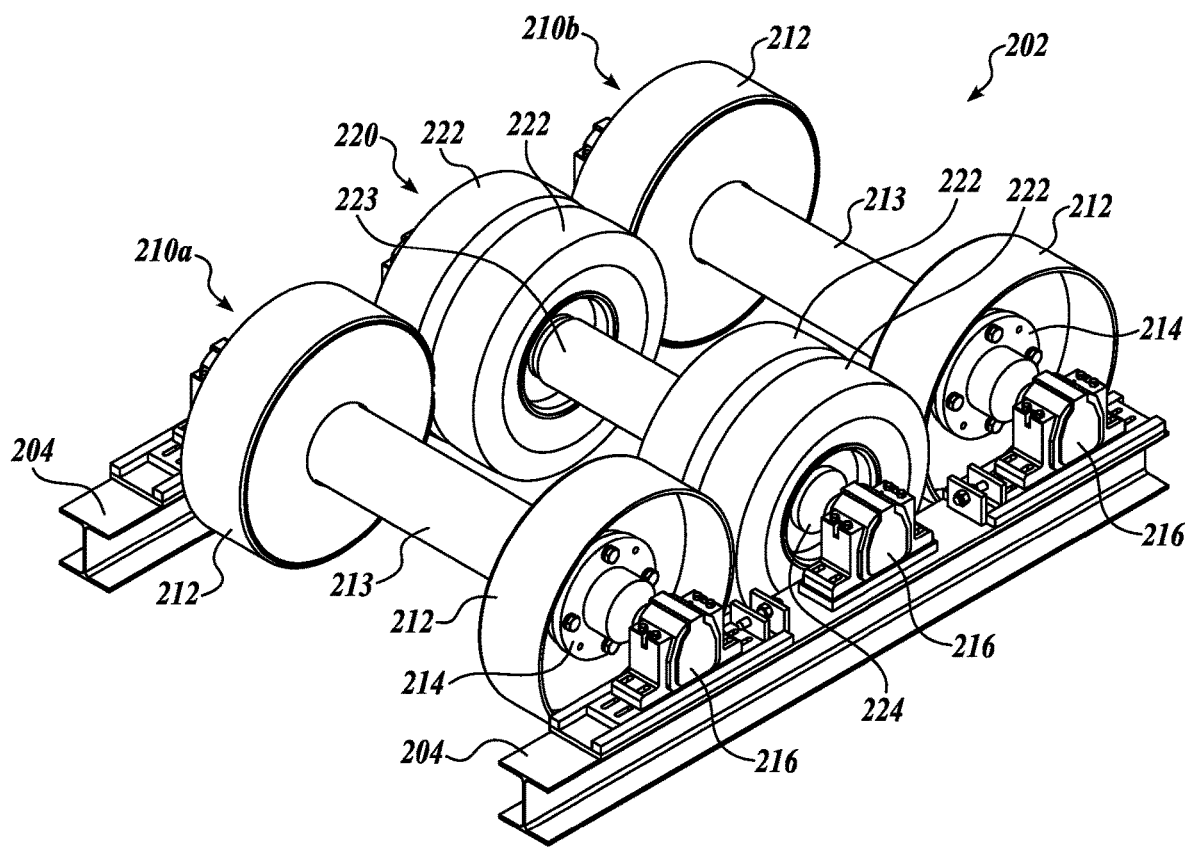
FIGS. 3A and 3B are assembled and exploded perspective views, respectively, of one belt tension-reducing device of the belt tension-reducing device stack shown in FIGS. 2A and 2B.
Figure 3B:
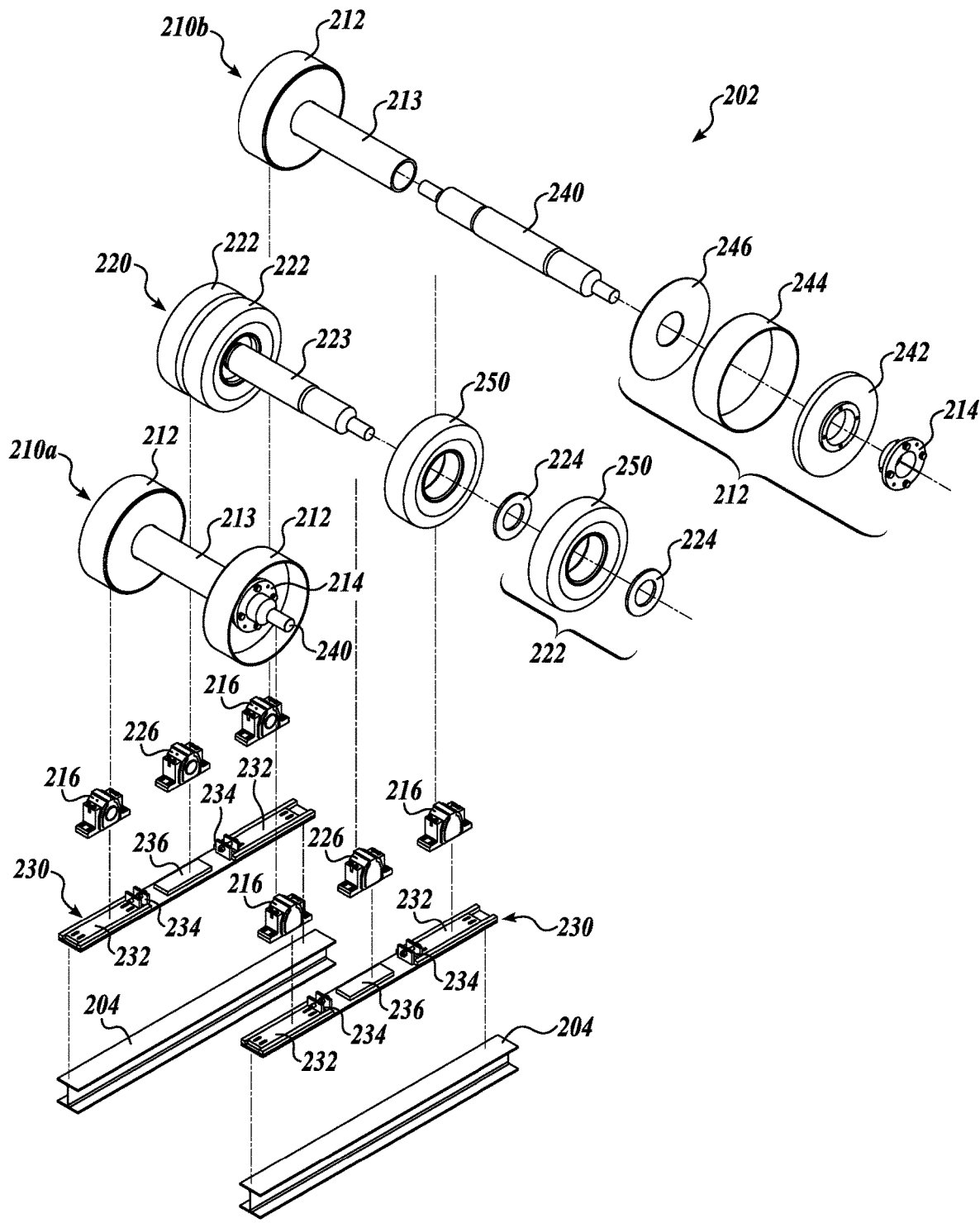

The vertical shaft portion of the system 100 can include a plurality of belt tension-reducing device stacks 200 ("stack assembly 200"; see FIGS. 2A and 2B), shown in FIG. 1 installed with each stack assembly 200 having three belt tension-reducing devices 202 ("devices 202"; see FIGS. 3A and 3B). The stack assemblies 200 can be positioned at a plurality of locations (two shown) along the system 100. The stack assemblies 200 are shown fixedly mounted to external supports 201a and 201b, and positioned to engage the upwardly moving portion 102c and the downwardly moving portion 102a of the conveyor belt 102 as will be explained in detail below. The external supports 201a and 201b can be, e.g., attached to a wall of the vertical shaft. Although the stack assemblies 200 are shown with clusters of three devices 202, it is contemplated that more or fewer devices 202 in each cluster may be used, as will be apparent to persons of skill in the art. Further, although the representative vertical shaft of the system 100 is shown with the stack assemblies 200 at two locations, any number of stack assemblies 200 or individual devices 202 may be used in the vertical shaft. The number of stack assemblies 200 and/or devices 202 in the vertical shaft can be determined based on loading of the conveyor belt 102, intended service, durability, length of vertical shaft, environment, corrosive exposure, cost, material availability, and/or any other design consideration.

FIGS. 2A and 2B are perspective and side views, respectively, of the belt tension-reducing device stack 200 shown in FIG. 1, having first, second, and third belt tension-reducing devices 202a, 202b, and 202c, respectively, in a stacked configuration. The devices 202a, 202b, and 202c can be configured to engage the conveyor belt 102 in opposing directions with portion 102a downwardly moving and portion 102c upwardly moving. The conveyor belt 102 can include two sidewalls 108 operably coupled to an outwardly facing side of the conveyor belt 102. In some embodiments, the sidewalls 108 are configured to carry the muck for removal from the vertical shaft therebetween. A trough can be formed between the sidewalls 108 with a cross member 105 (known as "crossflight" members, see FIG. 1) spanning the sidewalls 108 to form a cavity to carry muck and other material out of the vertical shaft to the surface. The crossflight members 105 can be formed from any suitable material, e.g., metal, urethane, etc. Additionally, the sidewalls can include features to allow reverse bending around the deflection wheel 103, such as a corrugated configuration (not shown, but see, e.g., Riffe FIG. 5).

The devices 202a, 202b, and 202c can each have external supports 204a, 204b, and 204c, respectively, spanning along the length of the devices 202a, 202b, and 202c. As will be described below, the external supports 204a, 204b, and 204c can operably tie the wheels of each device 202 together such that the radial spacing between the wheel is selectively fixed. The devices 202a, 202b, and 202c and the external supports 204a, 204b, and 204c can be vertically spaced apart by vertical supports 206ab between the external supports 204a and 204b, and by vertical supports 206bc between the external supports 204b and 204c. Although not shown in FIGS. 2A and 2B, further vertical or other supports may be included in the structure of the stack assembly 200 to maintain the desired positioning of the wheels of the devices 202a, 202b, and 202c.

FIGS. 3A and 3B are assembled and exploded perspective views, respectively, of one belt tension-reducing device 202 of the stack assembly 200. The device 202 includes a pliable center wheel assembly 220 having pliable wheels 222 (four wheels 222 shown), for example a pneumatic tire or the like. When installed, the pliable center wheel 222 is positioned between the downwardly moving portion 102a of the conveyor belt (not shown in FIGS. 3A and 3B) and the upwardly moving portion 102c of the conveyor belt (not shown in FIGS. 3A and 3B) such that the conveyor belt 102 contacts opposite sides of the pliable wheel 222. The pliable wheel 222 can include a tire 250 and a spacing washer 224 and assembled to be mounted and to freely rotate about a center shaft 223. For example, the pliable wheels 222 may be pneumatic tires, solid rubber tires, or suitable plastic tires. In some embodiments, the pliable wheels 222 are sized and positioned such that the wheels 222 can engage the belt portions 102a and 102c. For example, in this embodiment the wheels 222 are spaced apart and positioned to engage laterally outer sections of the belt portions 102a and 102c.

Although four wheels 222 are shown in the FIGURES, any number of pliable center wheels 222 is within the scope of the present disclosure, including two pliable wheels, six pliable wheels, etc. Likewise, the center shaft 223 of the pliable wheels 222 is shown as a simplified configuration, and may include bearings, bushings, fastening clips, and other components to promote the rotation of the wheels 222 with respect to the conveyor belt portions 102a and 102c. In this regard, the wheels 222 may include wheel bearings as are well known in the art. Additionally, the center shaft 223 can be radially and axially constrained by rotational bearings 216 operably coupled to the external support 204. The rotational bearings 216 can be a conventional pillow block type rotational bearing configured to allow free rotation of the center shaft 223. In other embodiments, any other rotational configuration of the pliable center wheels 222 is within the scope of the present disclosure.

The device 202 can include a first outboard roller assembly 210a rotatably and adjustably mounted to the external supports 204, such that the position of the first outboard roller assembly 210a along the external supports 204 can be adjusted towards or away from the pliable wheel assembly 220 using the adjustable mounts 232 and 234. The first outboard roller assembly 210a can include two outer rollers 212 separated by a shaft housing 213 surrounding an axle shaft 240. The two outer rollers 212 can be cylindrical steel rollers as shown in the illustrated embodiment. The outer rollers 212 can be positioned in a rollingly opposing position to the pliable wheels 222 such that the downwardly moving portion 102a of the conveyor belt 102 is located between the outer rollers 212 and the pliable wheels 222, and is engaged by the pliable wheels 222 and the outer rollers 212. In these embodiments, as the downwardly moving portion 102a travels downward, the outer rollers 212 rotate clockwise and the pliable wheels 222 rotate counterclockwise both relative to the orientation shown in FIG. 2B.

The device 202 can include a second outboard roller assembly 210b rotatably and adjustably mounted to the supports 204, such that the position of the second outboard roller assembly 210b along the external supports 204 can be adjusted towards or away from the pliable wheels 222 using the adjustable mounts 232 and 234. The second outboard roller assembly 210b can include two outer rollers 212 separated by a shaft housing 213 surrounding an axle shaft 240. The two outer rollers 212 can be cylindrical steel rollers as shown in the illustrated embodiment. The outer rollers 212 can be positioned in a rollingly opposing position to the pliable wheels 222, and opposite the first outboard roller assembly 210a, such that the upwardly moving portion 102c of the conveyor belt 102 is located between the outer rollers 212 of the second outboard roller assembly 210b and the pliable wheels 222 and is engaged by the pliable wheels 222 and the outer rollers 212. In these embodiments, as the upwardly moving portion 102c travels upward, the outer rollers 212 rotate clockwise and the pliable wheels 222 rotate counterclockwise both relative to the orientation shown in FIG. 2B.

In some embodiments, the center-to-center distances between the first and second outboard roller assemblies 210a and 210b and the pliable wheel assembly 220 are adjustable. For example, the adjustable mounts 232 can be laterally adjusted along the length of the external support 204 such that the outboard roller assemblies 210a and 210b are closer to or farther away from the pliable wheel assembly 220 fixed to the external support 204 by mounting plates 236. In this regard, the rollers 212 force or clamp the upwardly-moving belt portion 102c against the pliable wheels 222 on one side, and force or clamp the downwardly-moving belt portion 102a against the pliable wheels 222 on an opposite side, causing the pliable wheels 222 to deflect at the contact point of the conveyor belt 102.

The first and second outboard roller assemblies 210a and 210b include the outer rollers 212, which are shown in FIG. 3B as assemblies having an inner plate 246, a roller sleeve 244, an outer hub 242, and a bushing 214. Although the roller assemblies 210a and 210b are shown in one possible configuration, other roller assembly configurations are within the scope of the present disclosure, for example, a solid roller assembly, bearing roller assemblies, etc.

In use of the device 202, the force exerted by the downwardly moving portion 102a of the conveyor belt 102 will produce a movement on the pliable center wheel (e.g., counterclockwise as viewed in FIG. 2B), which in turn produces an upward force on the upwardly moving portion 102c of the conveyor belt 102. This upward force reduces the stress on the conveyor belt 102 as a result of the belt weight and the materials carried by the belt up the vertical shaft, allowing longer lengths of vertical shaft travel when compared to conventional systems.

By selecting the center-to-center distance between the first cylindrical roller assembly 210a and the pliable center wheel assembly 220, and independently selecting the center-to-center distance between the second cylindrical roller assembly 210b and the pliable center wheel assembly 220, a belt speed differential ratio between the downwardly moving portion 102a and the upwardly moving portion 102c of the conveyor belt 102 can be achieved so that the effective rolling radius of the pliable wheel 222 is less on the downwardly moving portion 102a and greater on the upwardly moving portion 102c. The result of the greater effective rolling radius of the pliable wheel 222 on the upwardly moving portion 102c is that a portion of the weight of the downwardly moving portion 102a is transferred to the upwardly moving portion 102c, reducing the stress in the downwardly moving portion 102a, while simultaneously facilitating the upward motion in the upwardly moving portion 102c. The differential effective rolling radius therefore reduces the stresses in both the downwardly and upwardly moving portions 102a and 102c, permitting longer lengths of vertical shaft to be serviced by the conveyor belt systems of the present disclosure It is contemplated that this speed differential can alternatively be achieved mechanically, magnetically, or hydraulically.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B." Similarly, the phrase "at least one of A, B, and C," for example, means (A), (B), (C), (A and B), (A and C), (B and C), or (A, B, and C), including all further possible permutations when greater than three elements are listed.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A belt tension-reducing device, comprising:
   a support member;
   a pliable central wheel assembly rotatably coupled to the support member and having first and second pliable wheels spaced apart by an axle, wherein the first and second pliable wheels are configured to engage on a first side a downwardly moving portion of a conveyor belt, and on a second side an upwardly moving portion of the conveyor belt;
   a first outboard roller assembly rotatably coupled to the support member, the first outboard roller assembly having first and second outer rollers positioned to engage the downwardly moving portion of the conveyor belt, the first outer roller opposing the first side of the first pliable wheel, and the second outer roller opposing the first side of the second pliable wheel; and
   a second outboard roller assembly rotatably coupled to the support member, the second outboard roller assembly having third and fourth outer rollers positioned to engage the upwardly moving portion of the conveyor belt, the third outer roller opposing the second side of the first pliable wheel, and the fourth outer roller opposing the second side of the second pliable wheel,
   wherein a second effective rolling radius of the first and second pliable wheels at a contact point with the upwardly moving portion of the conveyor belt is greater than a first effective rolling radius of the first and second pliable wheels at a contact point with the downwardly moving portion of the conveyor belt.

2. The belt tension-reducing device of claim 1, wherein the first outboard roller assembly is slidingly coupled to the support member and movable in a direction along the support member such that the center-to-center distance between the first and second outer rollers and the first and second pliable wheels, respectively, can be adjusted to change the first effective rolling radius.

3. The belt tension-reducing device of claim 2, wherein the second outboard roller assembly is slidingly coupled to the support member and movable in a direction along the support member such that the center-to-center distance between the third and fourth outer rollers and the first and second pliable wheels, respectively, can be adjusted to change the second effective rolling radius.

4. The belt tension-reducing device of claim 1, wherein the conveyor belt has first and second sidewalls extending from the surface of the conveyor belt facing away from the pliable central wheel assembly, and wherein, in use, the first and second sidewalls are positioned between the first and second outer rollers of the first outboard roller assembly and between the third and fourth outer rollers of the second outboard roller assembly.

5. The belt tension-reducing device of claim 4, wherein the conveyor belt further comprises a plurality of cross members extending between the first and second sidewalls, and wherein the conveyor belt, the first and second sidewalls, and the cross member together form a cavity configured to carry material.

6. The belt tension-reducing device of claim 1, wherein the pliable central wheel assembly further comprises:

a third pliable wheel positioned on the axle adjacent to the first pliable wheel; and
a fourth pliable wheel positioned on the axle adjacent to the second pliable wheel.

7. The belt tension-reducing device of claim 1, wherein the first and second pliable wheels include pneumatic rubber tires, solid rubber tires, or plastic tires.

8. The belt tension-reducing device of claim 6, wherein the first, second, third, and fourth pliable wheels include pneumatic rubber tires, solid rubber tires, or plastic tires.

9. The belt tension-reducing device of claim 1, wherein the axle between the first and second pliable wheels is configured to balance differential rotation between the first and second pliable wheels.

10. The belt tension-reducing device of claim 1, wherein the first and second outboard rollers are separated by a first roller axle assembly configured to balance differential rotation between the first and second outboard rollers, and wherein the third and fourth outboard rollers are separated by a second roller axle assembly configured to balance differential rotation between the third and fourth outboard rollers.

11. A belt tension-reducing device assembly, comprising:
    a first belt tension-reducing device according to claim 1; and
    a second belt tension-reducing device according to claim 1,
    wherein the first and second belt tension-reducing devices are operably coupled in a stacked configuration.

12. The assembly of claim 11, wherein the support member of the first belt tension-reducing device is operably coupled to the support member of the second belt tension-reducing device by a vertical support member extending therebetween.

13. A vertical conveyor assembly for extracting material upward through a vertical shaft, the vertical conveyor assembly comprising:
    a conveyor belt;
    an above-ground portion having a downturn deflection wheel configured to guide the conveyor belt downwardly and into the vertical shaft;
    a take-up pulley at the bottom of the vertical shaft and configured to guide the conveyor belt upwardly and out of the vertical shaft;
    a belt tension-reducing device positioned between the downturn deflection wheel and the take-up pulley, the belt tension-reducing device comprising:
       a support member;
       a pliable central wheel assembly rotatably coupled to the support member and configured to engage on a first side a downwardly moving portion of the conveyor belt, and on a second side an upwardly moving portion of the conveyor belt;
       a first outboard roller assembly rotatably coupled to the support member and positioned to engage the downwardly moving portion of the conveyor belt, the first outboard roller assembly opposing the first side of the pliable central wheel assembly; and
       a second outboard roller assembly rotatably coupled to the support member and positioned to engage the upwardly moving portion of the conveyor belt, the second outboard roller assembly opposing the second side of the pliable central wheel assembly,
       wherein a first effective rolling radius of the pliable central wheel assembly at a contact point with the downwardly moving portion of the conveyor belt is less than a second effective rolling radius of the pliable central wheel assembly at a contact point with the upwardly moving portion of the conveyor belt.

14. The vertical conveyor assembly of claim 13, wherein the belt tension-reducing device is a first belt tension-reducing device, and wherein the vertical conveyor assembly further comprises a second belt tension-reducing device operably coupled in a stacked configuration with the first belt tension-reducing device, the second belt tension-reducing device comprising:
- a support member;
- a pliable central wheel assembly rotatably coupled to the support member and configured to engage on a first side a downwardly moving portion of the conveyor belt, and on a second side an upwardly moving portion of the conveyor belt;
- a first outboard roller assembly rotatably coupled to the support member and positioned to engage the downwardly moving portion of the conveyor belt upstream from the first belt tension-reducing device, the first outboard roller assembly opposing the first side of the pliable central wheel assembly; and
- a second outboard roller assembly rotatably coupled to the support member and positioned to engage the upwardly moving portion of the conveyor belt downstream from the first belt tension-reducing device, the second outboard roller assembly opposing the second side of the pliable central wheel assembly.

15. The vertical conveyor assembly of claim 13, further comprising a plurality of the belt tension-reducing devices positioned between the downturn deflection wheel and the take-up pulley.

16. The vertical conveyor assembly of claim 13, wherein the first outboard roller assembly is slidingly coupled to the support member and movable in a direction along the support member such that the center-to-center distance between the first outboard roller assembly and the pliable central wheel assembly can be adjusted to change the first effective rolling radius.

17. The belt tension-reducing device of claim 16, wherein the second outboard roller assembly is slidingly coupled to the support member and movable in a direction along the support member such that the center-to-center distance between the second outboard roller assembly and the pliable central wheel assembly can be adjusted to change the second effective rolling radius.

18. The belt tension-reducing device of claim 13, wherein the conveyor belt has first and second sidewalls extending from the surface of the conveyor belt facing away from the pliable central wheel assembly.

19. The belt tension-reducing device of claim 18, wherein the conveyor belt further comprises a plurality of cross members extending between the first and second sidewalls, and wherein the conveyor belt, the first and second sidewalls, and the cross member together form a cavity configured to carry material.

20. The belt tension-reducing device of claim 13, wherein the pliable central wheel assembly include pneumatic rubber tires, solid rubber tires, or plastic tires.

* * * * *